United States Patent
Naitou et al.

(10) Patent No.: US 9,682,478 B2
(45) Date of Patent: Jun. 20, 2017

(54) SAFETY MONITORING DEVICE FOR ROBOT GRIPPING AND CARRYING WORKPIECE

(71) Applicant: FANUC CORPORATION, Minamitsuru-gun, Yamanashi (JP)

(72) Inventors: Yasuhiro Naitou, Yamanashi (JP); Soichi Arita, Yamanashi (JP); Hiromitsu Takahashi, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 14/698,322

(22) Filed: Apr. 28, 2015

(65) Prior Publication Data

US 2015/0314445 A1 Nov. 5, 2015

(30) Foreign Application Priority Data

Apr. 30, 2014 (JP) .................................. 2014-093593

(51) Int. Cl.
*B25J 9/16* (2006.01)

(52) U.S. Cl.
CPC ............ *B25J 9/1674* (2013.01); *B25J 9/1676* (2013.01); *G05B 2219/40582* (2013.01)

(58) Field of Classification Search
CPC ....... B25J 9/1676; B25J 9/1633; B25J 9/1674
USPC ........................................................ 700/258
See application file for complete search history.

(56) References Cited

U.S. PATENT DOCUMENTS

| 4,848,474 A | 7/1989 | Parizot | |
| 7,221,119 B2* | 5/2007 | Hashimoto | ............... F16P 3/12 |
| | | | 318/467 |
| 7,391,178 B2* | 6/2008 | Tanaka | ................... B25J 9/1676 |
| | | | 318/568.2 |
| 8,712,589 B2 | 4/2014 | Nagata | |
| 8,897,918 B2 | 11/2014 | Goto | |

(Continued)

FOREIGN PATENT DOCUMENTS

| CN | 101239467 | 8/2008 |
| CN | 101376249 | 3/2009 |

(Continued)

*Primary Examiner* — Khoi Tran
*Assistant Examiner* — Robert Nguyen
(74) *Attorney, Agent, or Firm* — RatnerPrestia (57) ABSTRACT

A safety monitoring device monitoring a robot includes a workpiece parameter switching unit switching a workpiece parameter, an external force estimation unit estimating, as an external force estimation value, a force acting on the robot from an external environment by using the workpiece parameter, an external force monitoring unit stopping the robot when the external force estimation value satisfies an external force determination condition, an operation monitoring unit stopping the robot, based on conditions such as a position of the robot being included within a predetermined region, an operation monitoring state switching unit switching between a disabling command and an enabling command for the operation monitoring unit, and an external force determination condition setting unit switching the external force determination condition to an operation monitoring disabling time external force determination condition at the disabling command and to an operation monitoring enabling time external force determination condition at the enabling command.

4 Claims, 4 Drawing Sheets

(56) References Cited

U.S. PATENT DOCUMENTS

| | | |
|---|---|---|
| 2008/0188985 A1 | 8/2008 | Sakano |
| 2009/0058342 A1 | 3/2009 | Nihei |
| 2010/0152896 A1 | 6/2010 | Komatsu |
| 2010/0292843 A1 | 11/2010 | Kariyazaki |
| 2011/0245974 A1 | 10/2011 | Kawamoto |

FOREIGN PATENT DOCUMENTS

| | | |
|---|---|---|
| CN | 101952087 | 1/2011 |
| CN | 102233579 | 11/2011 |
| CN | 102773865 | 11/2012 |
| DE | 102006055849 | 5/2008 |
| DE | 102008005926 | 7/2009 |
| DE | 102009047033 | 5/2011 |
| DE | 102010048369 | 4/2012 |
| DE | 102012012988 | 4/2014 |
| JP | 08030327 | 2/1996 |
| JP | 08118283 | 5/1996 |
| JP | 200052286 | 2/2000 |
| JP | 2007029232 | 2/2007 |
| JP | B 5088156 | 8/2009 |
| JP | 2010069585 | 4/2010 |
| JP | B 5154712 | 6/2012 |

\* cited by examiner

SAFETY MONITORING DEVICE FOR ROBOT GRIPPING AND CARRYING WORKPIECE

BACKGROUND

1. Field of the Invention

The present invention relates to a safety monitoring device for a robot that grips and carries a workpiece. Furthermore, the invention relates to a safety monitoring device for monitoring a robot provided with a force detection unit for detecting a force or torque acting on the robot.

2. Description of the Related Art

A force detection unit attached to a robot detects a force or a torque (hereinafter referred to as "external force" as appropriate) that the robot receives from an external environment to stop the robot or allow the robot to take an avoidance action on the basis of the detected external force. This can reduce a force that the robot applies to the external environment.

When such a robot carries a workpiece, a detection value of the force detection unit changes depending on whether or not the robot grips the workpiece. In other words, the detection value can change by an amount corresponding to a mass of the workpiece. Accordingly, in order to detect the external force accurately, it is necessary to switch the mass of the workpiece, a position of the center of gravity of the workpiece, and an inertia matrix of the workpiece that are used for calculation of the external force (hereinafter referred to as workpiece parameters), in accordance with the workpiece.

In addition, even when the robot grips a workpiece, the force detection unit may not be able to detect an entire mass of the workpiece. One example is a situation where the robot lifts a workpiece placed on a table. Since the workpiece is supported by the table, the force detection unit does not detect the mass of the workpiece at all or detects only a part of the mass thereof when the robot merely grips the workpiece. Then, when the robot lifts the workpiece, the workpiece departs from the table, thereby allowing the force detection unit to detect the entire mass of the workpiece. Accordingly, after the robot grips the workpiece and before the workpiece departs from the table, the force detection unit cannot accurately detect an external force.

The same applies to when the robot places the workpiece on the table. Specifically, in the situation where the robot places the workpiece, after the workpiece comes in contact with the table and before the robot releases the workpiece, the force detection unit cannot accurately detect an external force. Accordingly, regarding the operation of the robot that lifts the workpiece and the operation thereof that places the workpiece, it is difficult to monitor safety of the robot even with the monitoring of an external force.

Japanese Patent Publication No. 5088156 discloses a robot safety monitoring device for monitoring safety at a time of replacement of tools. In this patent literature, when current tool information as control information in a program does not match tool information of an actually attached tool, safety at the time of replacement thereof is monitored by monitoring whether or not the position of a robot is within a predetermined region.

In addition, Japanese Patent Publication No. 5154712 discloses a technique for maintaining a resting state of a robot when the robot grips or releases a workpiece. In this technique, when the robot grips the workpiece, switching between workpiece parameters is performed to prevent the robot from starting to move.

In this connection, a description will be given of monitoring regarding gripping of a workpiece in the same manner as in Japanese Patent Publication No. 5088156. Specifically, when a workpiece parameter currently used for external force calculation does not match a workpiece parameter of an actually gripped workpiece, it is monitored whether or not the position of the robot is within a predetermined region. However, as described above, in the operation of the robot that lifts the workpiece and the operation thereof that places the workpiece, external force may not be accurately detectable even though the workpiece parameter used for external force calculation matches the workpiece parameter of the actually gripped workpiece. Thus, employment of the technique of Japanese Patent Publication No. 5088156 has a problem with safety.

In addition, Japanese Patent Publication No. 5154712 has a problem in that no safety measures are taken when the robot performs the operation of lifting a gripped workpiece.

The present invention has been accomplished in view of such circumstances, and it is an object of the invention to provide a robot safety monitoring device that allows a robot to safely perform the operation of lifting a workpiece and the operation of placing the workpiece.

SUMMARY OF THE INVENTION

In order to achieve the above-mentioned object, according to a first aspect of the present invention, there is provided a safety monitoring device for monitoring a robot provided with a force detection unit for detecting an external force acting on the robot, the robot safety monitoring device including: a workpiece parameter switching unit for switching a workpiece parameter including at least one of a mass, a center of mass, and an inertia matrix of a workpiece to be gripped by the robot; an external force estimation unit for estimating, as an external force estimation value, a force or a torque acting on the robot from an external environment by using the workpiece parameter switched by the workpiece parameter switching unit; an external force monitoring unit for stopping the robot when the external force estimation value satisfies an external force determination condition; an operation monitoring unit for stopping the robot when at least one of the following conditions is not satisfied: a position of the robot is included within a predetermined region, a moving direction of the robot is a predetermined direction, an operation speed of the robot is equal to or slower than a predetermined speed, and an operation acceleration of the robot is equal to or smaller than a predetermined acceleration; an operation monitoring state switching unit for switching between an operation monitoring disabling command for disabling the operation monitoring unit and an operation monitoring enabling command for enabling the operation monitoring unit; and an external force determination condition setting unit for switching the external force determination condition to an operation monitoring disabling time external force determination condition when switched to the operation monitoring disabling command and switching the external force determination condition to an operation monitoring enabling time external force determination condition when switched to the operation monitoring enabling command.

According to a second aspect of the invention, in the first aspect, the external force determination condition includes at least one of conditions that the external force estimation value exceeds a predetermined first value, a moving average of the external force estimation value exceeds a predetermined second value, and an amount of change between the external force estimation value before a predetermined time and the external force estimation value at present exceeds a predetermined third value.

According to a third aspect of the invention, in the first or the second aspect, when switched to the operation monitoring enabling command, the external force monitoring unit is adapted to be disabled.

According to a fourth aspect of the invention, in the first or the second aspect, the operation monitoring disabling time external force determination condition is a condition that the external force estimation value exceeds a first threshold value, and the operation monitoring enabling time external force determination condition is a condition that the external force estimation value exceeds a second threshold value more than the first threshold value.

According to a fifth aspect of the invention, in any of the first to the fourth aspects, when the external force estimation value estimated by the external force estimation unit does not satisfy a predetermined condition at a time when the operation monitoring state switching unit switches from the operation monitoring enabling command to the operation monitoring disabling command, the operation monitoring state switching unit stops switching from the operation monitoring enabling command to the operation monitoring disabling command.

The foregoing and other objects, features, and advantages of the present invention will become more apparent from the following detailed description of typical embodiments of the invention illustrated in the accompanying drawings.

DETAILED DESCRIPTION

Hereinafter, embodiments of the present invention will be described with reference to the accompanying drawings. In the drawings below, the same or similar members are denoted by the same or similar reference numerals. For easier understanding, the scales of the drawings have been changed as appropriate.

Figure 1:
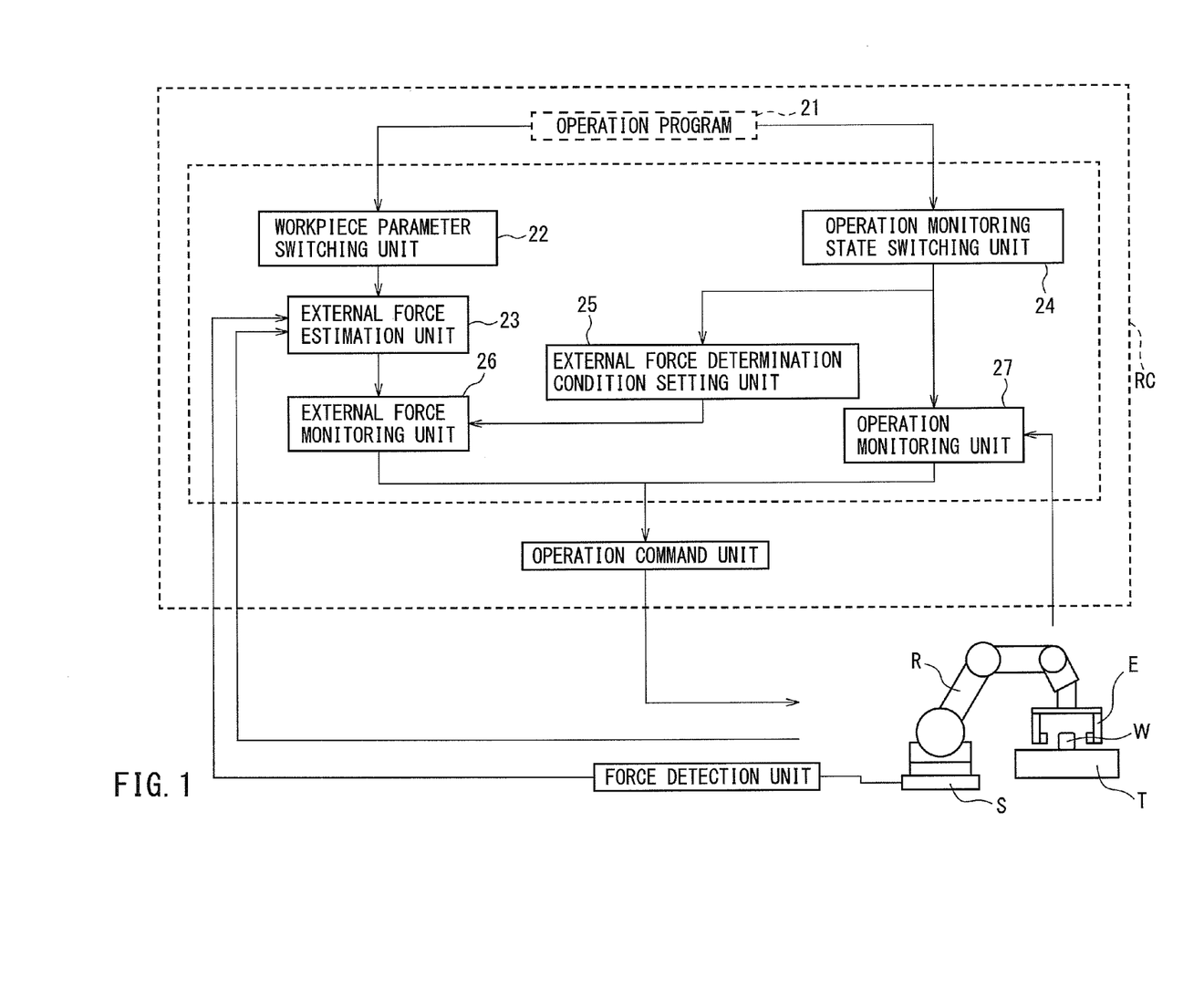
FIG. 1 is a diagram depicting a basic structure of a safety monitoring device according to an embodiment of the present invention.

FIG. 1 is a diagram depicting a basic structure of a safety monitoring device according to an embodiment of the present invention. As depicted in FIG. 1, a robot R, for example, a six-axis multi-joint robot is provided with an end effector E, for example, a gripper, at a tip end thereof. As depicted in the drawing, a workpiece W is placed on a table T. Additionally, a force sensor S for detecting a force or a torque is attached to a base portion of the robot R. However, the force sensor S may be incorporated in a robot arm of the robot R. In this case, the force sensor S detects a force or a torque that acts on a region ranging from a part of the robot where the force sensor S is attached, to the tip end of the robot and a workpiece.

A robot control device RC functioning as the safety monitoring device for the robot R includes an operation program 21 for the robot R. A workpiece parameter switching unit 22 of the robot control device RC acquires a workpiece parameter including at least one of a mass of the workpiece W, a center of mass of the workpiece w, and an inertia matrix of the workpiece W to switch the workpiece parameter depending on the workpiece W. In FIG. 1, the workpiece parameter switching unit 22 acquires the workpiece parameter from the operation program 21. However, an operator may input the workpiece parameter using a not-shown input unit. In a state where the robot R does not grip the workpiece W, setting of the workpiece parameter can be expressed in such a way that the mass is 0, the center of mass is 0, and the inertia matrix is 0. The workpiece parameter varies depending on the workpiece W. Accordingly, there are a plurality of workpiece parameters depending on kinds of workpieces W, and the like.

An external force estimation unit 23 of the robot control device RC calculates, as an external force estimation value, a force or a torque that acts on the robot R from an external environment such as a peripheral device. Specifically, the external force estimation unit 23 subtracts, from a force or a torque detected by the force sensor S, an own weight of each of the robot R and the workpiece W in a state where any external force does not act and a force or a torque acting on the force sensor S due to an inertial force generated by movement of each of the robot R and the workpiece W to calculate an external force estimation value.

An operation monitoring state switching unit 24 of the robot control device RC switches between an operation monitoring enabling command for enabling an operation monitoring unit 27 described later and an operation monitoring disabling command for disabling the operation monitoring unit 27. In FIG. 1, the operation monitoring state switching unit 24 acquires the operation monitoring enabling command or the operation monitoring disabling command from the operation program 21. However, an operator may input the operation monitoring enabling command or the operation monitoring disabling command using a not-shown input unit. In an example, it is assumed that the operation monitoring enabling command is described in an operation of the robot that lifts a workpiece and an operation thereof that places the workpiece in the operation program 21.

An external force determination condition setting unit 25 of the robot control device RC switches an external force determination condition depending on an operation monitoring state switched by the operation monitoring state switching unit 24. In other words, when the operation monitoring state is switched to the operation monitoring disabling command, the external force determination condition setting unit 25 switches the external force determination condition to an operation monitoring disabling time external force determination condition, whereas when it is switched to the operation monitoring enabling command, the external force determination condition setting unit 25 switches the external force determination condition to an operation monitoring enabling time external force determination condition. The external force determination condition is a condition for determining whether or not any external force has been applied to the robot, using an external force estimation value. The operation monitoring enabling time external force determination condition and the operation monitoring disabling time external force determination condition may be different from each other or the same as each other.

An external force monitoring unit 26 of the robot control device RC operates to stop the robot when an external force estimation value satisfies an external force determination condition (an operation monitoring enabling time external force determination condition or an operation monitoring disabling time external force determination condition).

Furthermore, the operation monitoring unit 27 of the robot control device RC evaluates at least one of conditions that a position of the robot R is included within a predetermined region, a moving direction of the robot R is a predetermined direction, an operation speed of the robot R is equal to or slower than a predetermined speed, and an operation acceleration of the robot R is equal to or smaller than a predetermined acceleration. Then, when at least one of the conditions is not satisfied, the operation monitoring unit 27 stops the robot R.

In other words, in the present embodiment, the external force monitoring unit 26 monitors safety of the robot using an external force estimation value, and also, the operation monitoring unit 27 monitors safety of the robot using the position of the robot, and the like.

Then, when switched to the operation monitoring disabling command, only the external force monitoring unit 26 monitors safety of the robot, whereas when switched to the operation monitoring enabling command, the operation monitoring unit 27 predominantly monitors safety of the robot. When switched to the operation monitoring enabling command, the external force monitoring unit 26 may continue monitoring or may be disabled, as will be described later.

Whether the position of the robot R is included within a predetermined region may be determined by a joint angle of the robot R or a position of a tip end portion of the robot R. Whether the moving direction of the robot R is a predetermined direction may be determined by a joint operation direction of the robot R or an operation direction of the tip end position of the robot R. Whether the operation speed of the robot R is equal to or slower than a predetermined speed may be determined by a joint speed of the robot R or a speed of the tip end position of the robot R. Whether the operation acceleration of the robot R is equal to or smaller than a predetermined acceleration may be determined by a joint acceleration of the robot R or an acceleration of the tip end position thereof.

In this regard, a description will be given of a force or torque (external force) applied to the robot R by the workpiece W. As depicted in FIG. 1, it is assumed that the force sensor S is attached to a base portion of the robot R. In addition, the robot R is assumed to have a mass of 200 kg, and the workpiece W is assumed to have a mass of 20 kg. The external force estimation unit 23 calculates an external force from the following equation (1):

(External force estimation value)=(Detection value of force sensor $S$)−(Estimation value of force acting on force sensor $S$ by masses of robot $R$ and workpiece $W$)−(Estimation value of inertial force acting on force sensor $S$ by operation of robot $R$ itself)   (1)

The following will be a description of a vertical direction component of an external force estimation value in a state where the robot R is at rest. When the robot R is at rest, a third term of the above equation is 0. Then, when the robot R grips the workpiece W, the workpiece mass in a second term of the equation is taken into consideration. When the robot R does not grip the workpiece W, the workpiece mass in the second term is not taken into consideration. In order to accurately detect an external force, an external force estimation value in a state where no external force is applied to the robot R needs to be 0 kg.

Figure 2:
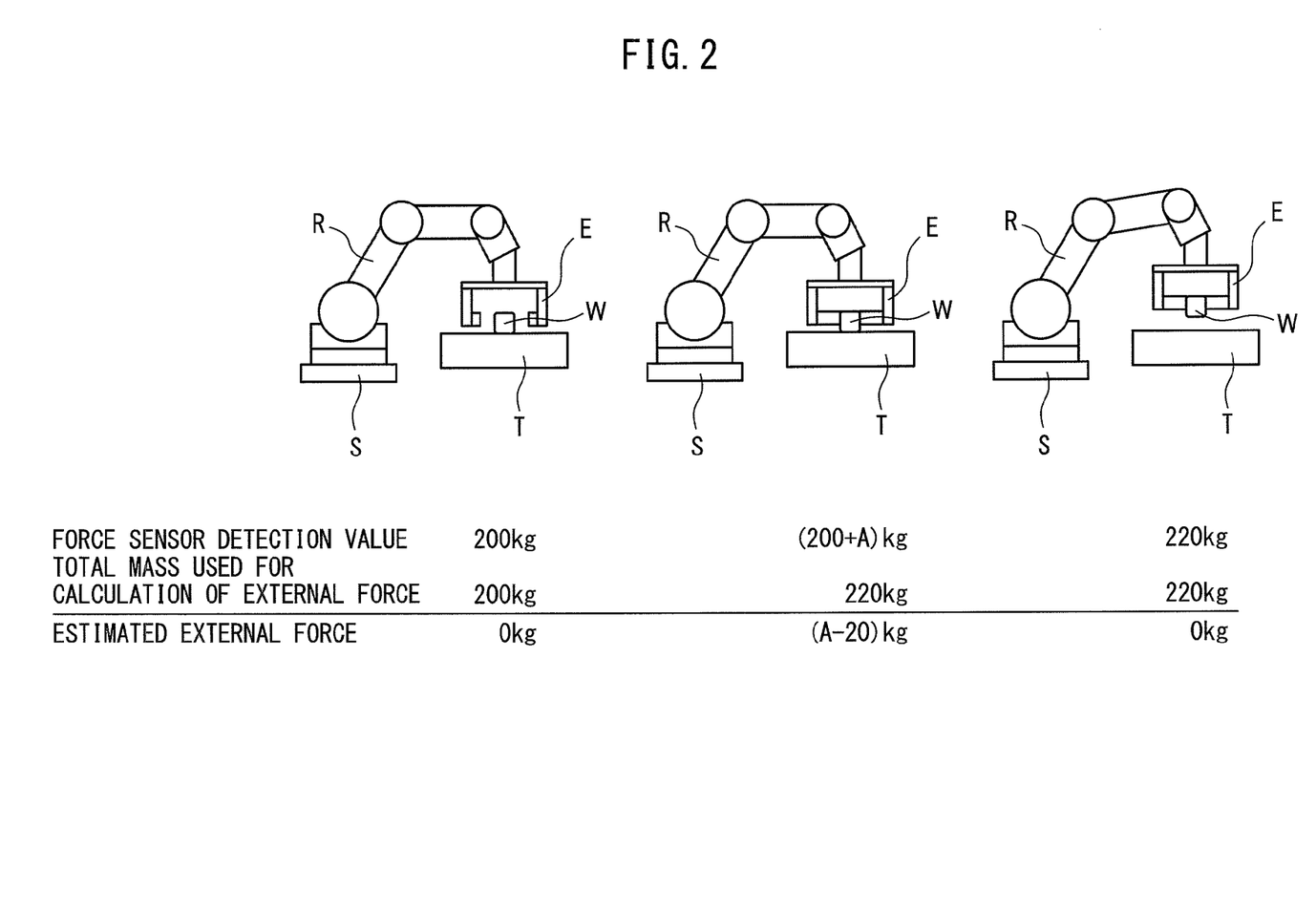
FIG. 2 is a diagram depicting a relationship between states of a robot and external force.

FIG. 2 is a diagram depicting a relationship between states of the robot and external force. On the left side of FIG. 2 is depicted a state of the robot R before gripping the workpiece W. In this case, it is obvious that the workpiece mass does not act on the force sensor S. Accordingly, the force sensor S has an output value of 200 kg. Even in the calculation of an external force, it is unnecessary to include the workpiece mass, so that a total mass to be used for the external force calculation is 200 kg. At this time, an external force estimation value obtained when no external force is applied to the robot R is 0 kg. In this case, an external force can be accurately detected.

At the center of FIG. 2 is depicted a state where while the robot R is gripping the workpiece W, the workpiece W is at least partially being supported by the table T. In this case, a part of the workpiece mass acts on the force sensor S depending on a direction of gripping force. Thus, the detection value of the force sensor S is (200+A) kg (0≤A<20 kg). Then, in this case, since the robot R is gripping the workpiece W, the workpiece mass is taken into consideration in the calculation of an external force, so that a mass total used for the calculation of the external force is 220 kg. Thus, an external force estimation value obtained when no external force is applied to the robot R is (A−20) kg. Accordingly, in this case, external force cannot be accurately detected.

On the right side of FIG. 2 is depicted a state where the robot R is lifting a gripped workpiece W. In this case, since the workpiece W is completely departing from the table T, the entire workpiece mass acts on the force sensor S. Accordingly, the detection value of the force sensor S is 220 kg. Since the robot R is gripping the workpiece W, the workpiece mass is taken into consideration in the calculation of an external force, so that a total mass used for the calculation of the external force is 220 kg. Then, an external force estimation value obtained when no external force is applied to the robot R is 0 kg. Accordingly, in this case, an external force can be accurately detected.

It is hence difficult to estimate a force of the workpiece mass acting on the force sensor S after the robot R grips the workpiece W and before the robot R lifts the workpiece W, i.e., in the operation of the robot R that lifts the workpiece W. The same problem is also in the operation of the robot R that places the workpiece W. In other words, external force cannot be accurately detected in the operation in which the robot R lifts the workpiece W and the operation in which the robot places the workpiece W. The same applies to a case in which the robot R is provided with a torque sensor (not shown), instead of the force sensor S.

Figure 3A:
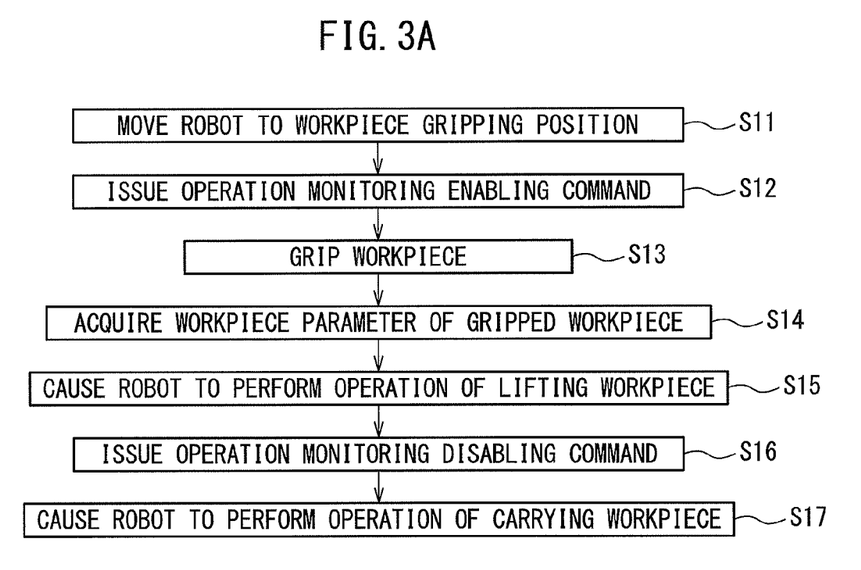
FIG. 3A is a flowchart depicting an operation of the safety monitoring device performed when a robot performs an operation of lifting a workpiece.

FIG. 3A is a flowchart depicting an operation of the safety monitoring device executed when the robot performs the operation of lifting a workpiece. When executing the operation, the operation program 21 is assumed to be read. In addition, the workpiece W is assumed to be placed on the table T in advance. The operation depicted in FIG. 3A may be directly commanded by an operator using a not-shown input unit or may be controlled by an external control controller (not shown).

First, in a step S11 of FIG. 3A, the robot R is moved to a position at which the robot R can grip the workpiece W. Next, in a step S12, the operation monitoring state switching unit 24 outputs an operation monitoring enabling command for enabling the operation monitoring unit 27.

Then, in a step S13, the robot R grips the workpiece W by the end effector E. Next, in a step S14, the workpiece parameter switching unit 22 acquires a workpiece parameter of the gripped workpiece W from the operation program 21.

Next, in a step S15, the robot R performs the operation of lifting the workpiece W. When the robot R lifts the workpiece W until the workpiece W completely departs from the table T, the operation monitoring state switching unit 24 outputs an operation monitoring disabling command for disabling the operation monitoring unit 27 in a step S16. Finally, in a step S17, the robot R performs a carrying operation of carrying the workpiece W to a predetermined place.

Figure 3B:
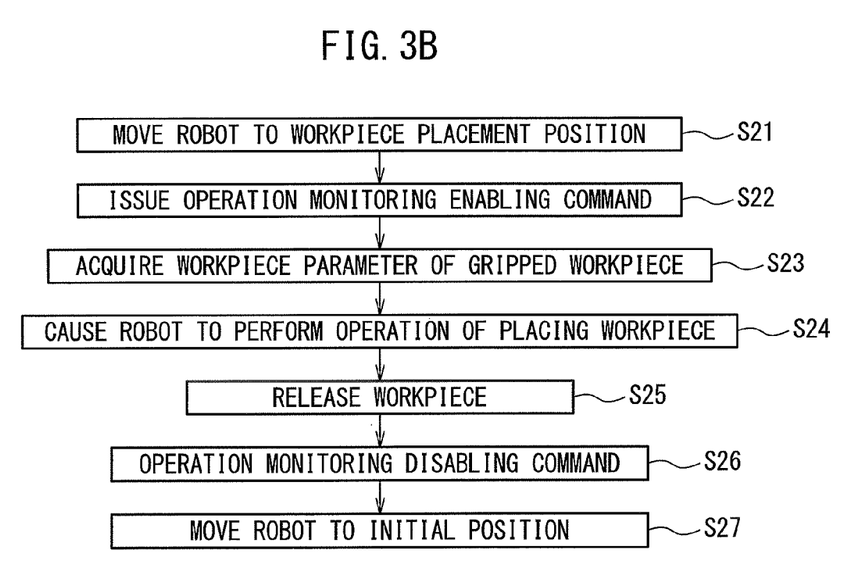
FIG. 3B is a flowchart depicting an operation of the safety monitoring device performed when the robot performs an operation of placing the workpiece.

FIG. 3B is a flowchart depicting an operation of the safety monitoring device when the robot R performs the operation of placing a workpiece W. At this time, the robot R is assumed to have already gripped the workpiece W by the end effector E. Then, in a step S21, the robot R is moved to a position at which the workpiece W is to be placed. Next, in a step S22, the operation monitoring state switching unit 24 outputs an operation monitoring enabling command for enabling the operation monitoring unit 27. Next, in a step S23, the workpiece parameter switching unit 22 acquires a workpiece parameter of the gripped workpiece W from the operation program 21.

After that, in a step S24, the robot R performs the operation of placing the workpiece W on the table T. Next, in a step S25, the end effector E of the robot R is released to complete the placement of the workpiece W on the table T. Then, the operation monitoring state switching unit 24 outputs an operation monitoring disabling command for disabling the operation monitoring unit 27. Finally, in a step S27, the robot R moves to an initial position.

As described above, in the present embodiment, when the robot R performs the operation of lifting the workpiece W and the operation of placing the workpiece W, an operation monitoring enabling command is output, where the operation monitoring unit 27 monitors safety of the robot R. When the operation monitoring enabling command is not output (when an operation monitoring disabling command is output), the external force monitoring unit 26 is assumed to monitor safety of the robot.

As illustrated with reference to FIG. 2, an accurate external force cannot be obtained after the robot R grips a workpiece W and before the robot R lifts the workpiece W. In addition, the same applies also to when the robot R performs the operation of placing the workpiece W. Accordingly, it is meaningless to monitor on the basis of external force during the periods of these operations. Due to this, in the present embodiment, an operation monitoring enabling command is output before the operation of the robot that lifts the workpiece W and the operation thereof that places the workpiece W. At this time, the operation monitoring unit 27 monitors safety of the robot R. When the operation monitoring enabling command is not output (when an operation monitoring disabling command is output), the external force monitoring unit 26 is assumed to monitor safety of the robot R.

Figure 4:
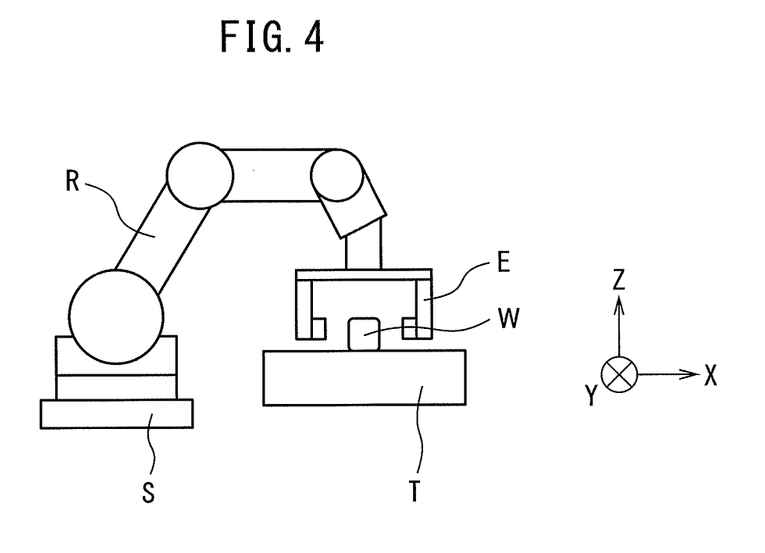
FIG. 4 is a diagram depicting a state of the robot before gripping a workpiece in an embodiment.

FIG. 4 is a diagram depicting a state of the robot before gripping a workpiece W in an embodiment of the invention, and is the same drawing as that depicted on the left side of FIG. 2. Hereinafter, an example will be given of when the robot R lifts a workpiece W of 20 kg, with reference to FIG. 4. In a coordinate system indicated in FIG. 4, components in respective three directions X, Y, and Z of an external force estimation value are assumed to be fx, fy, and fz, respectively.

In addition, the operation monitoring disabling time external force determination condition is assumed to be "|fx|>3 kg, |fy|>3 kg, or |fz|>3 kg". Additionally, the operation monitoring enabling time external force determination condition is assumed to be "|fx|>3 kg, |fy|>3 kg, fz<−3 kg, or fz>+21 kg".

Then, in the step S12 of FIG. 3A, when the operation monitoring state becomes enabled, the external force determination condition setting unit 25 switches the external force determination condition to the operation monitoring enabling time external force determination condition. The operation monitoring enabling time external force determination condition is a determination condition under which the external force monitoring unit 26 does not detect that external force has been applied in a state where the gripped workpiece W is in contact with the table T and any external force other than a force acting on the robot R from the table T via the workpiece T is not applied to the robot R.

Then, in a state where when the robot R lifts the workpiece W, the force applied to the robot R from the table T via the workpiece W acts in a +Z direction by (20−A) kg (0≤A<20 kg) and any external force other than the force is not applied, the resulting external force estimation value is expressed by fx=0 kg, fy=0 kg, and fz=20−A kg (0≤A<20 kg). According to the operation monitoring enabling time external force determination condition, the external force monitoring unit 26 does not incorrectly determine that external force has been applied to the robot R.

In this state, when an external force of 21 kg is applied in the +Z direction, fz=41−A kg (0≤A<20 kg). In other words, since fz>+21 kg, it is determined that external force has been applied to the robot R.

When an external force of 23 kg is applied in a −Z direction, fz=−3−A kg (0≤A<20 kg). In other words, since fz<−3 kg, it is determined that external force has been applied to the robot R. Accordingly, even when an external force smaller than 23 kg in the −Z direction is applied, it is not determined that external force has been applied. Regarding external forces in the X and Y directions, regardless of the operation monitoring state, it is determined, with respect to a same external force, that external force has been applied.

In this way, in the present embodiment, when external force monitoring does not accurately work (when the robot performs the operation of lifting a workpiece and the operation of placing the workpiece), the condition is changed so that it is not determined that external force has been applied in spite of the fact that no external force has actually been applied. Thus, in the present embodiment, the external force monitoring unit 26 does not stop the robot R due to the incorrect determination, so that reduction in operation efficiency of the robot R can be prevented. However, during a time of changing the condition, the external force monitoring unit 26 does not substantially work and therefore the operation monitoring unit 27 monitors safety.

When the operation monitoring state is enabled, the operation monitoring unit 27 evaluates at least one of the conditions that the position of the robot R is included within a predetermined region, the moving direction of the robot R is a predetermined direction, the operation speed of the robot R is equal to or slower than a predetermined speed, and the operation acceleration of the robot R is equal to or smaller than a predetermined acceleration. In this case, all of the conditions may be evaluated or one or more of the conditions may not be evaluated. When at least one of the conditions is not satisfied, the operation monitoring unit 27 stops the robot R.

It is assumed that, as the predetermined region, an operation region of the robot R in which, after gripping the workpiece W, the robot R lifts the workpiece W whereby the workpiece W is brought into a state of being completely departed from the table T is set in advance. The predetermined region to be set may be a region of a joint angle of the robot R or may be an operation region of the tip end portion of the robot R.

In addition, as the predetermined direction, an operation direction in which the robot R lifts the workpiece W is assumed to be set in advance. The predetermined direction to be set may be an operation direction of each joint or an operation direction of the tip end portion of the robot R.

Furthermore, as the predetermined speed and the predetermined acceleration, there are assumed to be set in advance a speed and an acceleration at which a force applied to an external environment is equal to or weaker than a permissible force even when the robot R is in contact with the external environment. The predetermined speed and the predetermined acceleration to be set may be a speed and an acceleration of each joint or a speed and an acceleration of the tip end portion of the robot R.

Such an operation monitoring performed by the operation monitoring unit 27 can ensure safety of the robot R for the external environment when the robot R lifts the workpiece W.

A set of external force estimation values satisfying the operation monitoring enabling time external force determination condition does not necessarily have to be included in a set of external value estimation values satisfying the operation monitoring disabling time external force determination condition. For example, when the operation monitoring unit 27 monitors the operation direction of the tip end portion of the robot R, external force determination conditions may be set to be strict for any external force estimation value other than in the operation direction thereof.

When the robot R is accelerated or decelerated, an inertial force of the robot R is generated in the operation direction of the robot R. In the present embodiment, external force is estimated considering the inertial force. However, since there is an individual difference (variation) in the mass of the workpiece W, it is difficult to accurately estimate the inertial force. Accordingly, external force estimation value also can vary in the direction in which the robot R operates.

For example, assuming that a workpiece mass in the workpiece parameter is m and a variation of the workpiece mass due to an individual difference is $\Delta m$, an actual workpiece mass is expressed as $m+\Delta m$. Then, when the workpiece W moves at an acceleration $\alpha=(ax, ay, az)$, the movement generates an inertial force $(m+\Delta m)\alpha$. At this time, since the workpiece mass in the workpiece parameter is m, an inertial force that can be estimated is $m\alpha$. According to the above-mentioned equation (1), the variation of mass of the workpiece W causes an error of $\Delta m\alpha$ in the external force estimation value.

Accordingly, it is necessary to prevent an incorrect determination in which due to the variation of the inertial force of the robot R itself, the external force monitoring unit 26 determines that external force has been applied to the robot R in spite of the fact that any external force has not been applied thereto. To do that, it is preferable to relax a threshold value of the external force determination condition by an amount of the variation of an external force estimation value predicted in advance. When the operation monitoring state is disabled, the robot R can operate in an arbitrary direction and the workpiece W also can operate in an arbitrary direction. For this reason, it may be necessary to consider amounts of variations in external force determination conditions for all directions.

In monitoring of the operation direction of the robot R by the operation monitoring unit 27, a direction in which the robot R actually moves can be limited when the operation monitoring state is enabled. In other words, external force determination conditions for directions in which the robot R does not move may be made stricter than when the operation monitoring state is disabled.

In the Example depicted in FIG. 4, the robot R lifts the workpiece W in the +Z direction. Accordingly, there is provided an operation monitoring condition that the tip end portion of the robot R operates only in the +Z direction. In other words, when the robot R is about to actually operate in the X and Y directions, the robot R is caused to be stopped. In this case, since the acceleration of the workpiece W is not generated in the X and Y directions, errors $\Delta m\times ax$ and $\Delta m\times ay$ in external force estimation values of the X and Y directions caused by the variation of the workpiece mass are zero.

When the magnitudes of $\Delta m\times ax$ and $\Delta m\times ay$ are estimated to be 1 kg at the largest, the operation monitoring disabling time external force determination condition is assumed to be "$|fx|>3$ kg, $|fy|>3$ kg, or $|fz|>3$ kg". In addition, the operation monitoring enabling time external force determination condition is assumed to be "$|fx|>2$ kg, $|fy|>2$ kg, $fz<-3$ kg or $fz>+21$ kg".

Then, when an external force of 2.5 kg is actually applied to the robot R, it is not determined that external force has been applied to the robot R, in the operation monitoring disabling time. In the operation monitoring enabling time, the external force is determined as an external force applied thereto.

As described above, variation of the inertial force has less influence in the operation monitoring enabling time. When it can be determined, with respect to smaller external forces, that external force has been applied to the robot R, the external force determination condition may be set so that such a determination can be made.

When the threshold value of the operation monitoring disabling time external force determination condition is sufficiently large, the operation monitoring disabling time external force determination condition may be the same as the operation monitoring enabling time external force determination condition. For example, in the above-described example, the operation monitoring disabling time external force determination condition and the operation monitoring enabling time external force determination condition are assumed to be "$|fx|>30$ kg, $|fy|>30$ kg, or $|fz|>30$ kg". In this condition, only when a larger external force than 30 kg is applied, the robot R is stopped. When the system structure has no problem even when an external force of 30 kg or less acts on the robot R, such a condition as above is set.

Then, when the robot R lifts the workpiece W, even when an external force of 40 kg is applied to the robot R in the $-Z$ direction, an external force estimation value in the Z direction becomes $fz=(20-A)-40=-20-A$ ($0\leq A<20$ kg). This indicates that it may not be determined that the external force has been applied. Accordingly, even when the threshold value of the external force determination condition is sufficiently large, it is still the same in that external force monitoring does not accurately work.

However, when no external force is applied to the robot R, the external force estimation value obtained when the robot R lifts the workpiece W is $fz=(20-A)$ ($0\leq A<20$ kg). In other words, the external force monitoring unit 26 does not incorrectly determine that external force has been applied in spite of the fact that no external force has actually been applied to the robot R. Thus, when the threshold value of the operation monitoring disabling time external force determination condition is sufficiently large, the robot R is not uselessly stopped by incorrect determination of external force monitoring even when the operation monitoring disabling time external force determination condition is the same as the operation monitoring enabling time external force determination condition.

As described above, in the present embodiment, when the robot R performs the operation of lifting a workpiece W and the operation of placing the workpiece W, the external force determination condition is switched to the operation monitoring enabling command to change the external force determination condition so that the operation monitoring unit 27 is enabled. This can prevent the external force monitoring unit 26 from determining that external force has been applied to the robot R in spite of the fact that no external force has been applied thereto and stopping the robot R. Accordingly, the present embodiment allows the robot R to safely perform the operation of lifting a workpiece W and the operation of placing the workpiece W.

The external force determination condition setting unit 25 preferably includes an external force determination condition including at least one of conditions that the external force estimation value exceeds a predetermined first value, a mean value of external force estimation values from before a predetermined time up to a current time exceeds a predetermined second value, and an amount of change from an external force estimation value before the predetermined time up to a current external force estimation value exceeds a predetermined third value. In other words, the external force determination condition setting unit 25 may include all of the conditions or may include any one thereof. Accordingly, the external force determination condition setting unit 25 can appropriately set a condition under which the external force monitoring unit 26 stops the robot R.

Examples of such an external force determination condition include "fx>3 kg", "a mean value of fx in the past 0.1 seconds is 3 kg or more", and "a difference between fx before 0.1 seconds and a current fx is ±3 kg or more". Using such a condition, it is determined that external force has been applied to the robot R. Additionally, with the use of the condition that the external force estimation value exceeds a predetermined value, it can be determined that external force has been applied to the robot R when the magnitude of external force increases.

The detection value of the force sensor S may contain noise. By calculating a moving average of an external force estimation value by a known means, it can be determined whether external force has been applied to the robot R while eliminating influence of the noise.

In addition, when the robot R collides with the external environment, the external force estimation value continues to fluctuate from an initial contact of the robot R with the external environment until the safety monitoring device determines that external force has been applied to the robot R and stops the robot R. The manner of fluctuation of the external force estimation value varies depending on various factors, such as the speed of the robot R and a material of the external environment. In such a case, it is preferable to set an external force determination condition, at the earliest possible timing, by which the safety monitoring device can determine that external force has been applied to the robot R.

Additionally, when an external force estimation value sharply fluctuates, it is preferable to determine, using a change in the external force estimation value, whether external force has been applied to the robot R. In such a case, it may be possible to determine that external force has been applied to the robot R, at a timing earlier than a timing of determination using the magnitude of the external force estimation value. In addition, an external force determination condition may be set by combining the conditions described above as appropriate.

Figure 5:
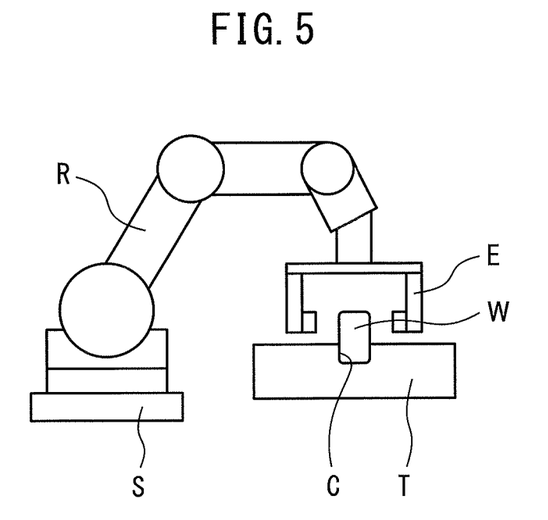
FIG. 5 is a diagram depicting a state of the robot before gripping a workpiece in another embodiment.

FIG. 5 is a diagram depicting a state of the robot before gripping a workpiece in another embodiment of the invention. On a top surface of the table T depicted in FIG. 5 is formed a recess portion C having a size corresponding to the workpiece W. As depicted in FIG. 5, the workpiece W is partially fitted into the recess portion C, whereby a part of the workpiece W is protruded from the top surface of the table T.

In such a situation, when the robot R lifts the workpiece W, friction force occurs on the table T and the workpiece W. Then, since the friction force acts on the force sensor S, external force estimation value is also influenced by the friction force. The friction force depends on individual differences in shape of the workpiece W, and the like and therefore cannot be estimated in advance. Accordingly, it is difficult to determine an external force determination condition that prevents the robot R from being stopped due to the determination that external force has been applied thereto when lifting the workpiece W.

In this case, external force determination is preferably disabled when the operation monitoring state is enabled. In other words, the external force determination condition used when the operation monitoring state is enabled is set to be a condition under which it is determined, with respect to all external force estimation values, that no external force has been applied. In short, when the operation monitoring state is enabled, external force monitoring is disabled.

This can prevent the robot R from being stopped in spite of the fact that no external force has been applied thereto. When the operation monitoring state is enabled, the operation monitoring unit 27 monitors safety of the robot R, so that safety of the robot R can be ensured even when the external force monitoring unit 26 is disabled.

As described above, when operation monitoring is enabled, the external force estimation value may not represent an accurate external force. For this reason, when external force monitoring by the external force monitoring unit 26 does not accurately work, the operation monitoring state is preferably switched to "enable". In addition, the operation monitoring enabling time external force determination condition is set to be a more moderate condition than the operation monitoring disabling time external force determination condition. For example, when the operation monitoring disabling time external force determination condition is a condition that the external force estimation value exceeds a first threshold value, the operation monitoring enabling time external force determination condition is a condition that the external force estimation value exceeds a second threshold value more than the first threshold value.

This can prevent the external force monitoring unit 26 from incorrectly determining that external force has been applied to the robot R in spite of the fact that no external force has been applied thereto. As a result, it can be prevented that the robot R is stopped due to the incorrect determination.

For example, as described above, the operation monitoring disabling time external force determination condition is assumed to be "|fz|>3 kg". During an operation monitoring enabling time, this condition can cause the incorrect determination that external force has been applied to the robot R in spite of the fact that no external force has been applied thereto. Accordingly, the operation monitoring enabling time external force determination condition is set to be more moderate than the operation monitoring disabling time external force determination condition, like "fz<−3 kg or fz>+21 kg". This can prevent the incorrect determination, as described above.

When an external force estimation value estimated by the external force estimation unit 23 does not satisfy a predetermined condition at a time when the operation monitoring state switching unit 24 switches from the operation monitoring enabling command to the operation monitoring disabling command, the switching from the operation monitoring enabling command to the operation monitoring disabling command may be stopped.

In this case, when the operation monitoring state is about to be switched from "enable" to "disable", it can be confirmed whether or not external force monitoring accurately works. Then, when external force monitoring does not accurately work, the operation monitoring state can remain enabled. In other words, when the external force monitoring unit 26 does not accurately work, the operation monitoring unit 27 is enabled to continue to monitor safety of the robot R.

As described above, when an external force estimation value satisfies a predetermined condition at the time when the robot R lifts the workpiece W and an operation monitoring disabling command is input, the operation monitoring state switching unit 24 switches the operation monitoring state to "disable". When the external force estimation value does not satisfy the predetermined condition, the operation monitoring state switching unit 24 leaves the operation monitoring state "enable". The predetermined condition is, for example, "|fx|<1 kg, |fy|<1 kg, or |fz|<1 kg".

For example, consideration will be given to a situation where, due to an error in creation of the operation program or any other reason, an operation monitoring disabling command is input before the workpiece W completely departs from the table T. In this case, since fz=20−A kg (0<A<20 kg), the operation monitoring state remains "enable" without being switched. At this time, since the external force monitoring unit 26 does not accurately detect, the operation monitoring unit 27 continues to monitor safety of the robot R.

As the predetermined condition, there may be set any condition other than the external force determination condition used by the external force monitoring unit 26. As described above, in the external force monitoring unit 26, it may be necessary to set an external force determination condition including an error occurring when estimating an inertial force during operation of the robot R.

In contrast to this, when constructing a system that allows the operation monitoring state to be switched from "enable" to "disable" only during a time where the robot R is at rest, it is unnecessary to include any error in the estimation of an inertial force. In such a case, the condition used when switching the operation monitoring state from "enable" to "disable" may be made strict. Additionally, regardless of whether the robot R is in operation or at rest, an error of workpiece mass influences an external force estimation value. Thus, the condition may be set by considering the error of workpiece mass.

In situations where a plurality of kinds of workpieces W are carried, the recess portion C is formed on the table T, and the recess portion C is not formed on the table T, a force that acts in a direction or during a time in which the workpiece W is lifted varies depending on the respective situations. Additionally, the direction of the operation of lifting the workpiece W is also different from a direction of the operation of placing the workpiece W.

Accordingly, the operation monitoring enabling time external force determination condition and the operation monitoring evaluation condition are set to be conditions suitable to the respective situations. Thus, there are prepared a plurality of operation monitoring enabling time external force determination conditions and a plurality of operation monitoring evaluation conditions. Then, it is preferable to use any of the operation monitoring enabling time external force determination conditions and any of the operation monitoring evaluation conditions suitable to the respective conditions. This allows the use of conditions suitable depending on the situations.

The operation monitoring unit 27 in the present embodiment monitors safety of the robot R, as an alternative means in states where external monitoring does not accurately work, such as the operation of the robot that lifts a workpiece and the operation thereof that places the workpiece. Additionally, when external monitoring accurately works, the operation monitoring state is disabled. In general, the position and speed of the robot R are often monitored for other purposes and the like. Thus, even when the operation monitoring state is disabled in the present embodiment, the position and speed of the robot R may be monitored.

Advantageous Effects of the Present Invention

In the first aspect, when the robot performs the operation of lifting a workpiece and the operation of placing the workpiece, the operation monitoring state is switched to the operation monitoring enabling command to change an external force determination condition so that the operation monitoring unit becomes enabled. In this way, it can be prevented that the external force monitoring unit stops the robot by determining that external force has been applied to the robot in spite of the fact that no external force has been applied thereto. Accordingly, the robot is allowed to safely perform the operation of lifting the workpiece and the operation of placing the workpiece.

In the second aspect, the condition under which the external force monitoring unit stops the robot can be appropriately set.

In the third aspect, even when the external force monitoring unit is disabled, safety of the robot is continued to be monitored. This is advantageous when the robot grips a workpiece partially fitted into a recess portion formed on a table.

When the operation monitoring unit is enabled, for example, in the operation of the robot that lifts the workpiece and the operation thereof that places the workpiece, the external force estimation value can be inaccurate. In the fourth aspect, the operation monitoring enabling time external force determination condition is set to be more moderate than the operation monitoring disabling time external force determination condition. This can prevent the external force monitoring unit from incorrectly determining that external force has been applied to the robot in spite of the fact that no external force has been applied thereto. In the fifth aspect, whether or not the external force monitoring unit accurately works is confirmed by whether or not the external force estimation value satisfies a predetermined condition. Then, when the external force estimation value estimated by the external force estimation unit does not satisfy the predetermined condition, it is determined that the external force monitoring unit does not accurately work, thereby stopping switching to the operation monitoring disabling command. Accordingly, when the external force monitoring unit does not accurately work, the operation monitoring unit is caused to be enabled to continuously monitor safety of the robot.

While the present invention has been described using the typical embodiments, those skilled in the art would be able to understand that the above-described changes, and various other changes, omissions, and additions can be performed without departing from the scope of the invention.

What is claimed is:

1. A safety monitoring method for monitoring a robot provided with a force detection unit for detecting an external force acting on the robot, the robot safety monitoring method comprising:

utilizing a safety monitoring device comprising:
  a workpiece parameter switching unit for switching a workpiece parameter including at least one of a mass, a center of mass, and an inertia matrix of a workpiece to be gripped by the robot;
  an external force estimation unit configured to estimate, as an external force estimation value, a force or a torque acting on the robot from an external environment by using the switched workpiece parameter;
  an external force monitoring unit configured to stop the robot when the external force estimation value satisfies an external force determination condition;
  an operation monitoring unit configured to stop the robot when at least one of the following conditions is not satisfied: a position of the robot is included within a predetermined region, a moving direction of the robot is a predetermined direction, an operation speed of the robot is equal to or slower than a predetermined speed, and an operation acceleration of the robot is equal to or smaller than a predetermined acceleration;
  an operation monitoring state switching unit configured to switch between an operation monitoring disabling command operation monitoring enabling command and
  an external force determination condition setting unit configured to switch the external force determination condition to an operation monitoring disabling time external force determination condition when the operation monitoring state switching unit is switched to the operation monitoring disabling command;
  wherein external force determination condition setting unit is further configured to switch the external force determination condition to an operation monitoring enabling time external force determination condition when the enabling command;
switching the workpiece parameter including at least one of the mass, the center of mass, and the inertia matrix of the workpiece to be gripped by the robot;
estimating, as the external force estimation value, the force or the torque acting on the robot from the external environment by using the switched a workpiece parameter;
stopping the robot when the external force estimation value satisfies the external force determination condition;
stopping the robot when at least one of the following conditions is not satisfied: the position of the robot is included within the predetermined region, the moving direction of the robot is the determined direction, the operation speed of the robot is equal to or slower than the predetermined speed, and the operation acceleration of the robot is equal to or smaller than the predetermined acceleration;
switching between the operation monitoring disabling command and the operation monitoring enabling command;
switching the external force determination condition to the operation monitoring disabling time external force determination condition when the operation monitoring state switching unit is switched to the operation monitoring disabling command; and
switching the external force determination condition to the operation monitoring enabling time external force determination condition when the operation monitoring state switching unit is switched to the operation monitoring enabling command.

2. The safety monitoring method according to claim 1, wherein the external force determination condition includes at least one of conditions that the external force estimation value exceeds a predetermined first value, a moving average of the external force estimation value exceeds a predetermined second value, and an amount of change between the external force estimation value before a predetermined time and the external force estimation value at present exceeds a predetermined third value.

3. The safety monitoring method according to claim 1, wherein the operation monitoring disabling time external force determination condition is a condition that the external force estimation value exceeds a first threshold value, and the operation monitoring enabling time external force determination condition is a condition that the external force estimation value exceeds a second threshold value which is greater than the first threshold value.

4. The safety monitoring method according to claim 1, wherein when the estimated external force estimation value does not satisfy a predetermined condition at a time of switching from the operation monitoring enabling command to the operation monitoring disabling command, the switching from the operation monitoring enabling command to the operation monitoring disabling command is stopped.

* * * * *